United States Patent [19]

Waugaman

[11] Patent Number: 5,414,939
[45] Date of Patent: May 16, 1995

[54] CONTACT MEASUREMENT OF CONTAINER DIMENSIONAL PARAMETERS

[75] Inventor: John L. Waugaman, Perrysburg, Ohio

[73] Assignee: Owens-Brockway Glass Container Inc., Toledo, Ohio

[21] Appl. No.: 83,544

[22] Filed: Jun. 28, 1993

[51] Int. Cl.⁶ .............................................. G01B 7/287
[52] U.S. Cl. ............................................ 33/522; 33/504; 33/546; 209/531
[58] Field of Search ..................... 33/522, 555.1, 550, 33/504, 505, 545, 546; 209/530, 531, 533; 73/865.8

[56] References Cited

U.S. PATENT DOCUMENTS

| | | |
|---|---|---|
| 2,542,090 | 2/1951 | Lorenz . |
| 3,196,550 | 7/1965 | McMeekin . |
| 3,273,710 | 9/1966 | Early et al. . |
| 3,289,834 | 12/1966 | Mathias . |
| 3,313,409 | 4/1967 | Johnson . |
| 3,420,369 | 1/1969 | Sorbie . |
| 3,757,940 | 9/1973 | Damm ................................. 209/531 |
| 3,819,047 | 6/1974 | Sorbie ................................. 209/530 |
| 3,923,158 | 12/1975 | Fornaa ............................... 209/531 X |
| 4,181,958 | 1/1980 | Juengel et al. ..................... 33/505 X |
| 4,433,785 | 2/1984 | Riggs et al. . |
| 4,435,904 | 3/1984 | Logan et al. ........................... 33/784 |
| 4,573,934 | 3/1986 | Strouse ............................. 209/531 X |

FOREIGN PATENT DOCUMENTS 2042180  9/1980  United Kingdom .................. 33/546

*Primary Examiner*—Alvin Wirthlin

[57] ABSTRACT

A system and method for contact measurement of dimensional parameters of a container in which rollers coupled to LVDT sensors are placed in contact with a container as the container is rotated about its central axis so that the sensors develop analog signals that vary as a function of variations in geometry of the container. The sensor output signals are fed through multiple input channels to an a/d convertor/multiplexer, which is controlled by a central microcontroller for selecting in turn among the plurality of sensor signals. Within the microcontroller, each sensor signal is compared to a threshold indicative of maximum acceptable deviation of the corresponding dimensional parameter, and the container under test is rejected if the parameter exceeds such threshold. The microcontroller includes facility for real-time display of measured parameters in English or metric units at the selection of an operator, and for communication of measurement data to a remote computer.

12 Claims, 12 Drawing Sheets

Microfiche Appendix Included
(4 Microfiche, 87 Pages)

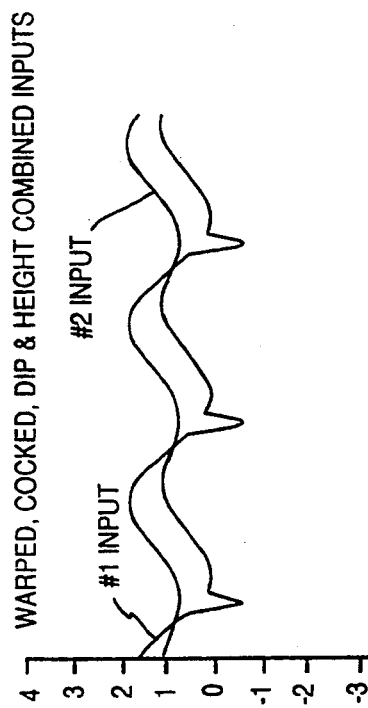
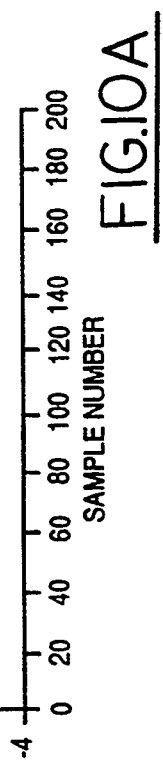
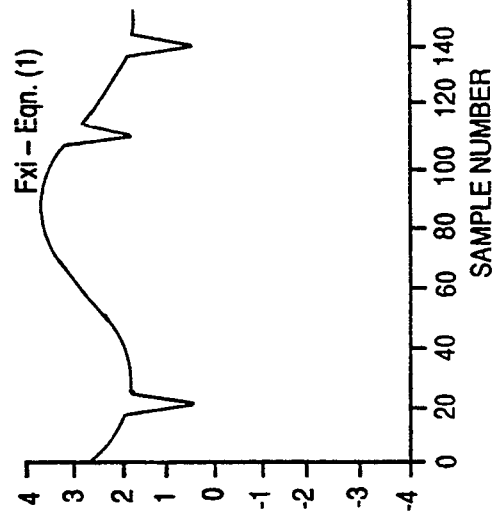
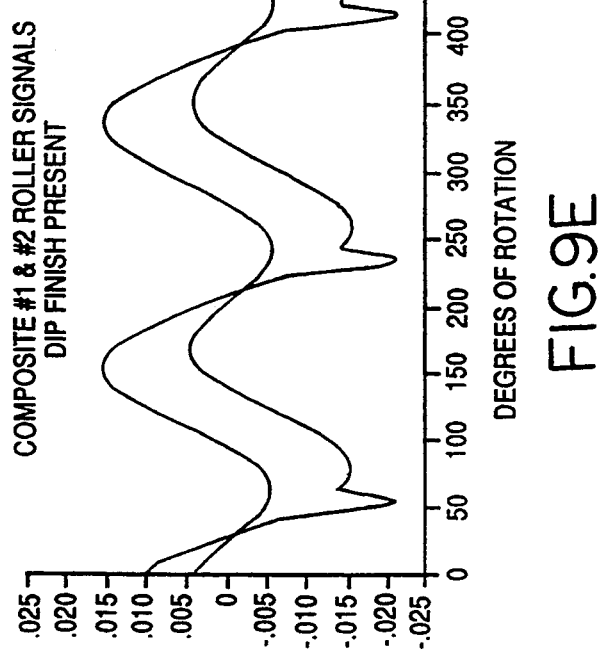

CONTACT MEASUREMENT OF CONTAINER DIMENSIONAL PARAMETERS

The present invention relates to contact measurement of dimensional parameters of containers, and more particularly to a system and method for digitally processing a plurality of parameter measurement signals.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Reference is made to a microfiche Appendix that accompanies this application, consisting of 4 sheets of fiche containing 187 frames.

BACKGRUOND AND OBJECTS OF THE INVENTION

U.S. Pat. No. 3,313,409 discloses an apparatus for inspecting glass containers in which a starwheel conveys containers in sequence through a series of inspection stations. At one of the stations, selected dimensional parameters of each container are inspected by contacting the container with rollers coupled to sensors, and rotating the container about its central axis so that the sensors provide output signals that vary as a function of variation of the container parameters. Specifically, external finish diameter, height, warp and dip, and cocked orientation of the container finish are measured by rollers that engage the container sealing surface and outer diameter as the container is rotated. The rollers are coupled to LVDT sensors that provide analog electrical signals which are indicative of deviation of the engaged surfaces. These signals are fed to appropriate electronics to energize a reject plunger for separating the container from the conveyor line if the measurement signals exceed the desired maximum threshold.

U.S. Pat. No. 4,433,785 discloses a container contact measurement system that may be used at one station of the system disclosed in the previously-noted patent for detecting and separating so-called "leaner" containers. Rollers engage the bottom of the container as the container is rotated. The rollers are coupled to LVDT's, which in turn provide electrical signals to measurement electronics for generating a reject signal if appropriate.

Although the inspection devices disclosed in the above-noted patents, both of which are assigned to the assignee hereof, have enjoyed substantial commercial success, improvements remain desirable. For example, the noted devices are essentially go/no-go gauges that do not embody facility for either measured parameter display, or communication of measured parameter data to external devices such as factory management computers. The analog circuitry employed in such devices is subject to variation and drift, requiring frequent calibration and providing less than optimum unit-to-unit consistency. The rejection setpoints or thresholds are set at a value determined by a sample set-up container, and thus require a time-consuming calibration procedure if the setpoints or thresholds are to be changed.

It is therefore a general object of the present invention to provide a system and method for contact measurement of one or more dimensional parameters of containers that address and improve upon one or more of the aforementioned deficiencies in the prior art. More specifically, it is an object of the present invention to provide a method and system for contact measurement of dimensional parameters of containers that embody real-time display of measured parameters and/or reject indication, that provide digital communication capability for downloading inspection data to factory management or process control computers, that exhibit improved accuracy and reliability by implementation of digital processing techniques, thereby eliminating problems associated with analog circuit drift while improving long term performance and consistency, that are easy to calibrate and adjust, and/or that employ digital filtering techniques for reducing sensitivity to speed of container rotation.

SUMMARY OF THE INVENTION

A system for contact measurement of at least one dimensional parameter of a container in accordance with the present invention includes a conveyor for delivering containers in sequence to an inspection station, and a roller/sensor construction at the station for contacting the container and providing an electrical analog signal as a function of a dimensional parameter of the container at the station. The analog signal is fed to an a/d convertor for converting the signal to digital format, and a microprocessor-based electronic controller compares the digitized sensor signal to at least one preset parameter signal threshold. The result of such comparison is displayed in real-time, preferably on an alphanumeric digital display that indicates numeric value of the parameter associated with the sensor signal. In the preferred embodiment of the invention, the microcontroller is also coupled to an alphanumeric keypad for operation setting of the comparison threshold, and for selection of either English or metric units at the display.

In the preferred embodiment of the invention, a plurality of rollers and LVDT sensors are disposed at the inspection station or stations for providing corresponding analog sensor signals as functions of a plurality of dimensional parameters of the container(s) under inspection. The plurality of sensor signals are received in a corresponding plurality of analog input channels, and the microcontroller includes facility for selecting among the plurality of channels for sequential digitization and storage of the parameter signals for each container. Each signal for each container is compared to a threshold that corresponds to a limit value of the corresponding parameter, and acceptability of the container is indicated as a function of such comparison. The microcontroller generates a reject signal appropriate to sort the container from the conveyor in the event that one or more measured parameters exceed the desired levels.

In accordance with another aspect of the present invention, the system is calibrated using a container for which at least one of the dimensional parameters is known. The container is placed at the inspection station and rotated about its central axis to develop a calibration signal that varies as a function of the known container parameter. The calibration signal is converted to digital format, and the corresponding parameter measurement is compared with the known value of that parameter for the calibration container. A scaling factor is developed for application to the calibration signal developed by the sensor to make the calibration signal equal to the desired known value thereof, and such scaling factor is then stored in the microcontroller and thereafter applied to the sensor signals during inspection of containers. Such electronic scaling is independent of the rejection setpoints or thresholds, which may be selectively varied by an operator without requiring recalibration of the system.

BRIEF DESCRIPTION OF THE DRAWINGS

The invention, together with additional objects, features and advantages thereof, will be best understood from the following description, the appended claims and the accompanying drawings in which:

FIGS. 9A–9E are graphic illustrations that depict sensor signals for cocked, warped and dip finish inspection; and FIGS. 10A–10F are graphic illustrations that depict separation of cocked, warped and dip finish signal components.

DETAILED DESCRIPTION OF PREFERRED EMBODIMENTS

Figure 1A:
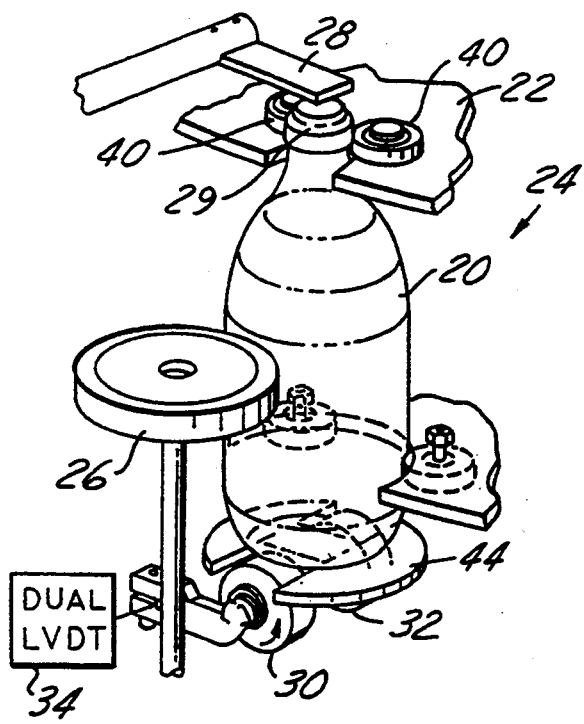
FIGS. 1A–1D are perspective views that schematically illustrate a series of contact measurement gauge inspection stations in accordance with the present invention.

FIGS. 1A–1D illustrate various inspection stations for contact measurement of dimensional parameters of glass or plastic containers. In FIG. 1A, a container 20 is conveyed by a starwheel 22 to a station 24 at which the container is engaged by a drive roller 26 to rotate the container about its central axis. A solenoid-actuated finger 28 engages the mouth of container 20 so as to hold the bottom of the container against a pair of spaced rollers 30,32 that engage diametrically opposite sides of the container bottom. Rollers 30,32 are coupled to respective cores of a dual LVDT 34 (FIGS. 1A and 2), which provides electronic signals indicative of vertical motion of the rollers. Station 24 is essentially identical to that illustrated in above-noted U.S. Pat. No. 4,433,785 for inspection and detection of so-called leaner containers.

Figure 1B:
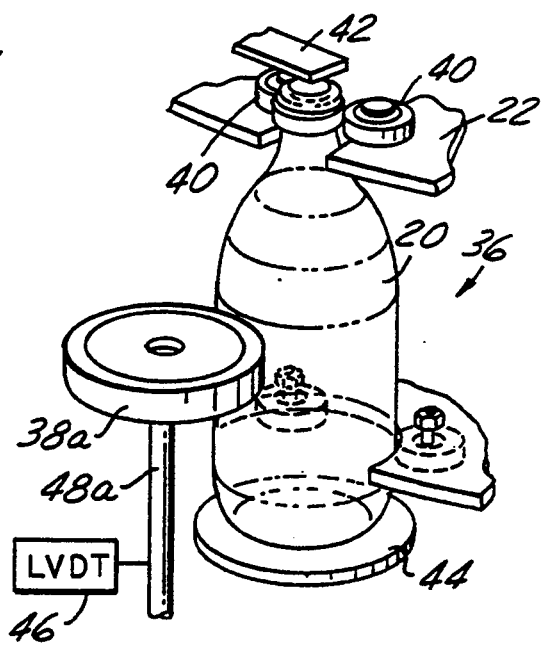

FIG. 1B illustrates container 20 at a station 36, in which the container is again engaged by a drive roller 38a. Roller 38a urges container 20 against rollers 40 carried by starwheel conveyor 22, and rotates the container about its central axis. The container is vertically engaged by a solenoid-actuated finger 42 that holds the container against the slide plate 44. A single-core LVDT 46 (FIGS. 1B and 2) is coupled to the shaft 48a of roller 38a for detecting motion of roller 38a and shaft 48a radially of container 20, and thereby detecting variations in container diameter.

Figure 1C:
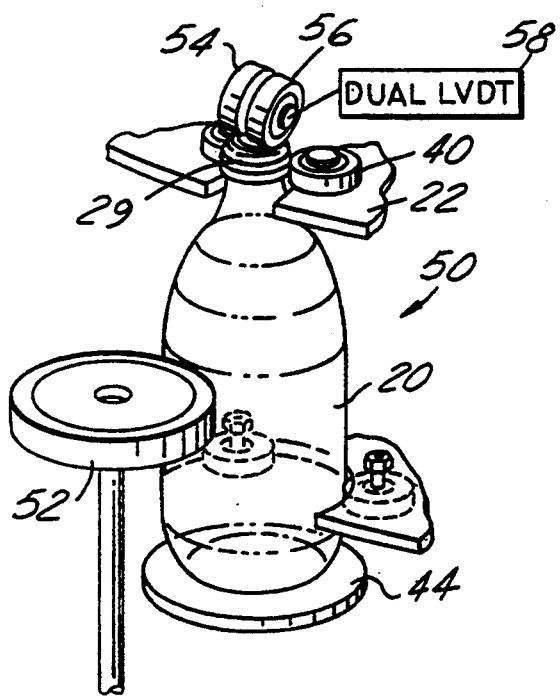
Figure 2:
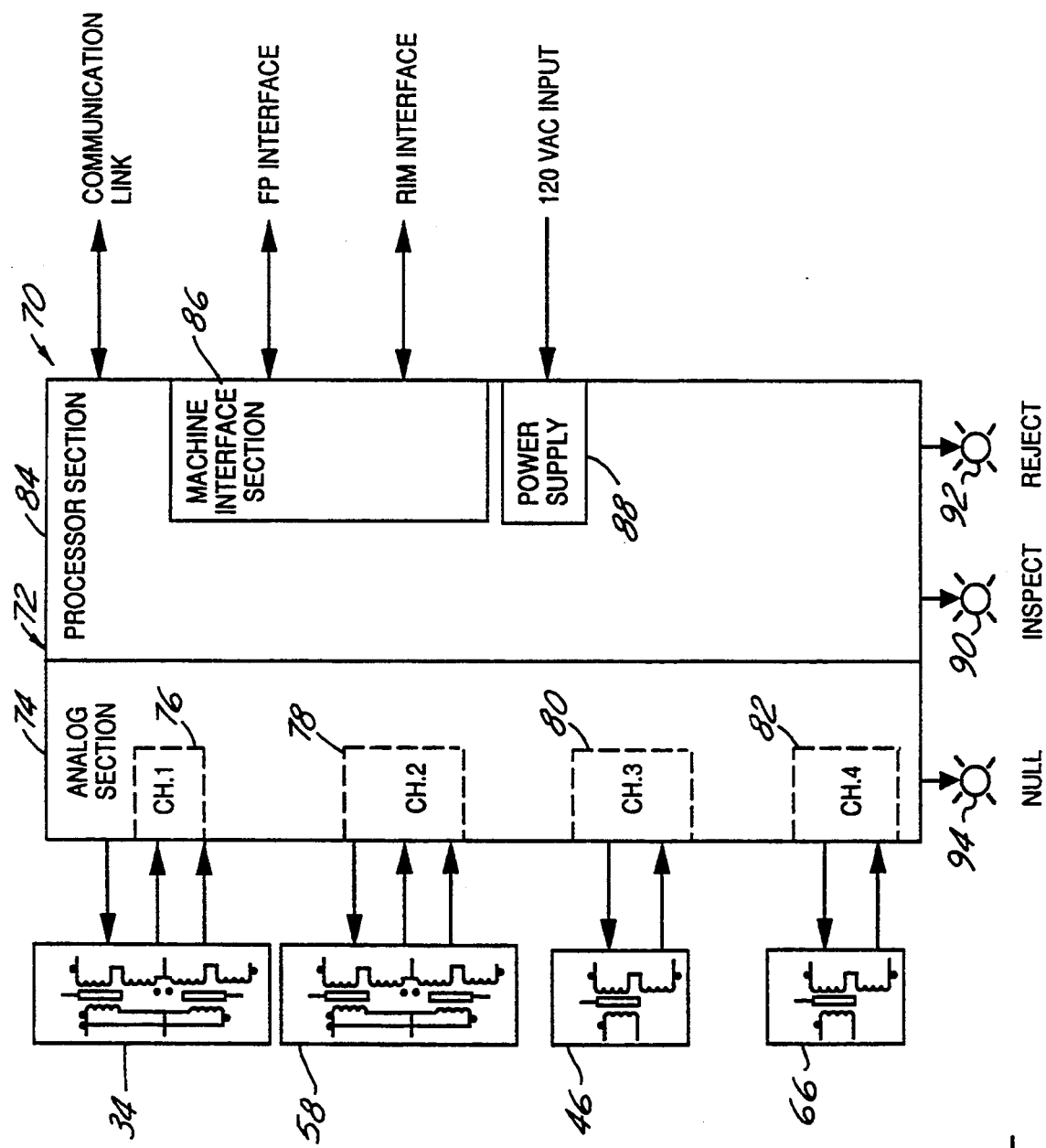
FIG. 2 is an overall functional block diagram of a contact measurement system in accordance with a presently preferred embodiment of the invention.

FIG. 1C illustrates container 20 at a station 50, at which the container is again engaged by a drive roller 52 that rotates the container about its central axis while holding the container against idler rollers 40 on conveyor 22. A pair of rollers 54,56 engage the axially facing sealing surface of container mouth 29 on diametrically opposite sides of the container. Rollers 54,56 are coupled to respective cores of a dual-core LVDT 58 (FIGS. 1C and 2). LVDT 58 provides electrical signals indicative of motion of the respective rollers as container 20 is rotated, which in turn are indicative of warp, dip and cocked finish at the container mouth.

Figure 1D:
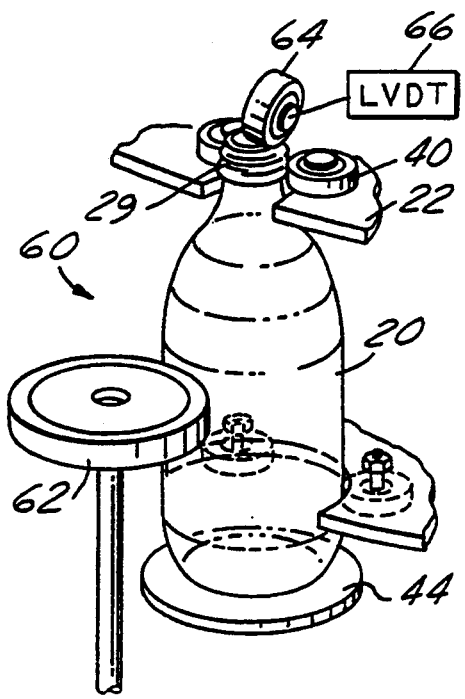

In FIG. 1D, container 20 is brought by conveyor 22 to a station 60 at which the container is again engaged by a drive roller 62 to rotate about its central axis. A roller 64 engages the sealing surface of container mouth 29, and is coupled to a single-core LVDT 66 (FIGS. 1D and 2) to provide electrical signals indicative of container height. Stations 36,50,60 in FIGS. 1B–1D are similar to corresponding inspection stations illustrated in above-noted U.S. Pat. No. 3,313,409. The disclosures of U.S. Pat. Nos. 3,313,409 and 4,433,785 are incorporated herein by reference. It will be recognized, of course, that various stations illustrated in FIGS. 1A–1D may be combined.

FIG. 2 is an overall functional block diagram of a contact measurement system 70 in accordance with a presently preferred embodiment of the invention. A system electronics package 72 includes an analog section 74 having separate input channels 76,78,80,82 respectively coupled to LVDT's 34,58,46 and 66. Analog section 74 is controlled by, and feeds LVDT sensor input data to, a digital processor section 84. Processor section 84 is coupled to a machine interface section 86, which includes facility for connection to two types of contact measurement machines employed by applicant's assignee. That is, machine interface section 86 is adapted to transmit and receive control information to and from a so-called container finish inspection or FP machine of the type illustrated in FP 515 High Speed Manual first published in September 1981 by Owens-Illinois, Inc., and to and from a so-called rotary inspection or RIM machine of the type illustrated in the Rotary Inspection Machine R.I.M. Operating Manual first published by Brockway, Inc. in December 1978.

Processor section 84 also includes a power supply 88 that receives 120 VAC input utility power, and provides electrical power to all other components of the system. Processor section 84 has facility for bi-directional serial communication with external management information or control computers, such as factory data collection systems and the like. Processor section 84 also drives a panel display lamp 90 to indicate to an operator when container inspection is in process, and a bank 92 of four lamps to indicate whether a container reject condition is indicated at any of the four input channels 76–82. To facilitate calibration of LVDT's 34,58,46 and 66, and the corresponding input channels of analog section 74, a lamp 94 on the operator panel indicates whether LVDT 34,46,58 or 66 selected by processor section 84 is in a null position.

Figure 3:
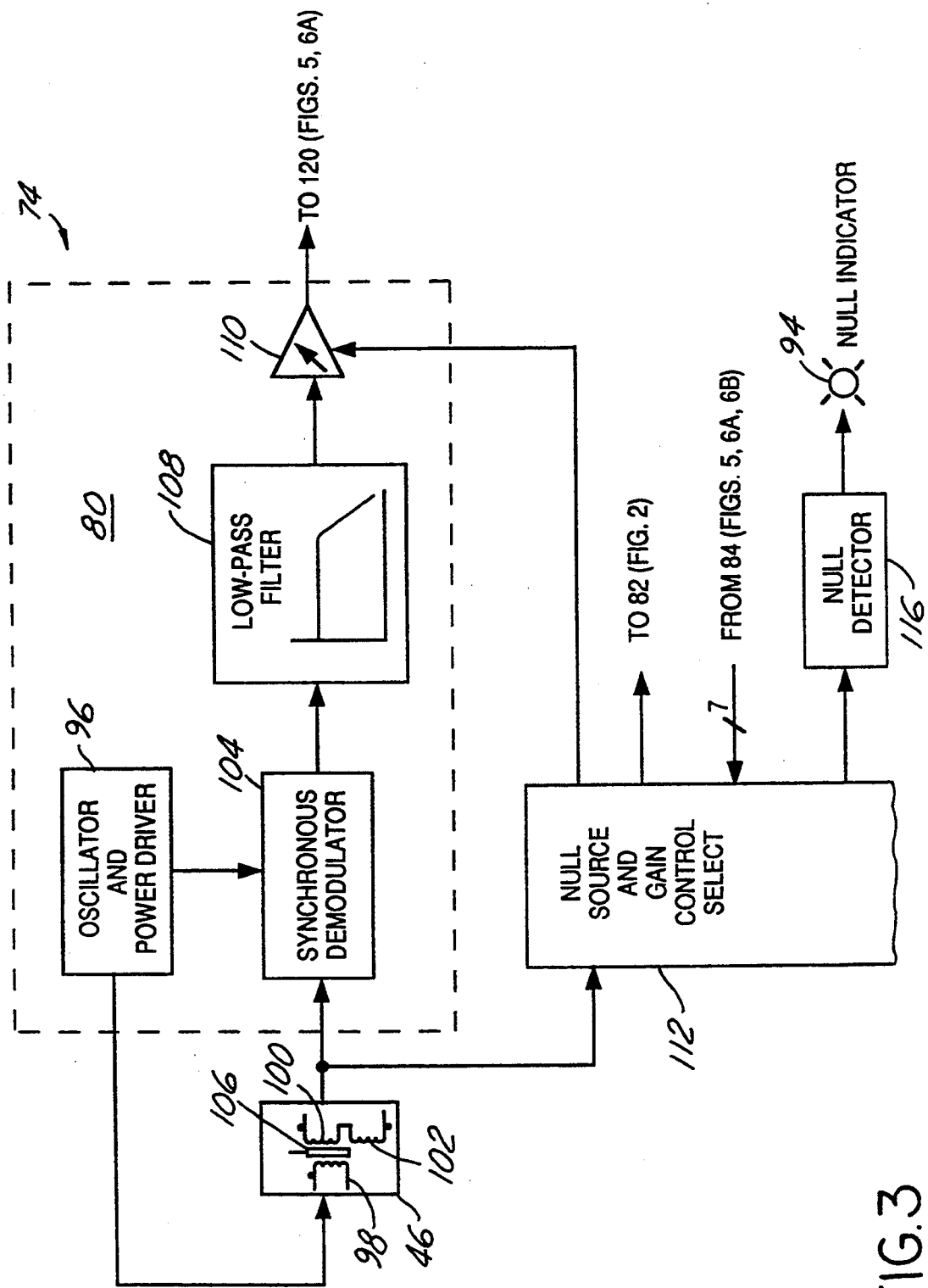
FIGS. 3 and 4 are functional block diagrams of exemplary input channels in the analog section of the system illustrated in FIG. 2.
Figure 4:
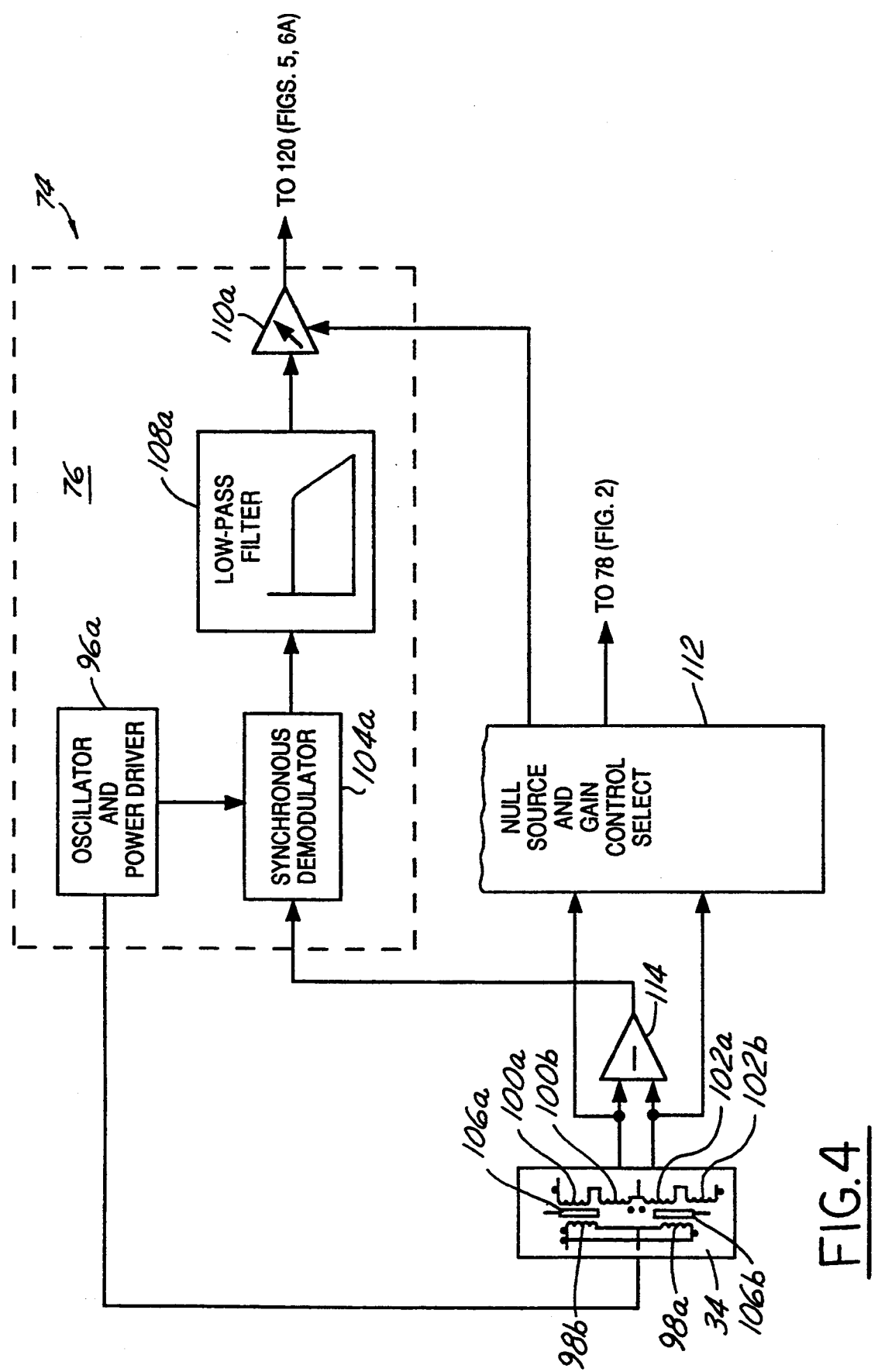

FIGS. 3 and 4 illustrate construction of analog section input channels 80 (FIG. 3) and 76 (FIG. 4), it being understood that channel 82 is identical to channel 80 illustrated in FIG. 3 and channel 78 is identical to channel 76 illustrated in FIG. 4. LVDT's 34,58,46 and 66 are of conventional type that have a primary winding excited by a fixed-amplitude periodic signal, and secondary windings that provide an output at amplitude and phase relative to the excitation signal that vary as a function of position of a movable ferromagnetic core. As noted above, the LVDT cores are coupled to rollers at the various container inspection stations 24,36,50,60 (FIGS. 1A–1D) for indicating variation in container dimension as the container is rotated about its central axis.

Referring to FIG. 3, channel 80 of analog section 74 includes an oscillator and power driver 96 that feeds a sinewave signal at controlled amplitude and frequency to the primary winding 98 of LVDT 46. The secondary windings 100,102 provide a periodic signal to a synchronous demodulator 104 that varies in amplitude and phase as a function of motion of LVDT core 106 relative to the primary and secondary windings, and thus as a function of motion of roller 38 and drive shaft 48 (FIG. 1B) with respect to the axis of rotation of container 20 in inspection station 36. Synchronous demodulator 104 receives a reference input from oscillator 96, and provides an output that is a full-wave rectified sinewave signal whose magnitude is determined by distance of LVDT core 106 from its null position, and whose sign is determined by direction of motion of core 106 with respect to the null position.

The excitation frequency component of the rectified sinewave signal is removed by a lowpass filter 108, leaving only the signal component related to position of the LVDT core. The angular velocity of container rotation depends upon container diameter and machine speed. The LVDT primary windings are energized at a frequency of 14 KHz in a preferred embodiment of the invention, and lowpass filter 108 in this embodiment has a cut-off frequency of 400 Hz. The output of filter 108 indicative of core position is applied to a scaling amplifier 110 whose gain is set by a null source and gain control selection circuit 112 (FIGS. 3 and 4). As will be noted in detail hereinafter, the gain of each scaling amplifier is set by processor section 84 (FIG. 2), which allows the contact measurement system to be calibrated to a standard set-up container, with the gain of each scaling amplifier being adjusted to make the system display show the calibrated container value.

FIG. 4 illustrates dual-core LVDT 34, having dual primary windings 98a, 98b driven by an oscillator and power driver 96a within channel 76. Four secondary windings 100a,100b,102a,102b provide respective differential signals as inputs to a differential amplifier 114 as respective functions of position of cores 106a,106b. The output of amplifier 114 is connected to one input of a synchronous demodulator 104a, which receives a reference input from oscillator and power driver 96a. The output of demodulator 104a is fed through a lowpass filter 108a to a scaling amplifier 110a, with amplifier gain being controlled by null source and gain control select circuit 112 as previously described. Circuit 112 is common to all four I/O channels 76,78,80,82, and thus provides amplifier gain control outputs to the gain control amplifiers of channels 82 and 78. The secondary windings of LVDT's 34,58,46,66 are also connected as inputs to circuit 112, which detects null position of the LVDT selected by the processor section, and provides a corresponding signal to a null detection amplifier 116 (FIG. 3) that drives lamp 94 (FIGS. 2 and 3). Selection of the channel to be nulled during a set-up operation is thus controlled by the processor section.

Figure 5:
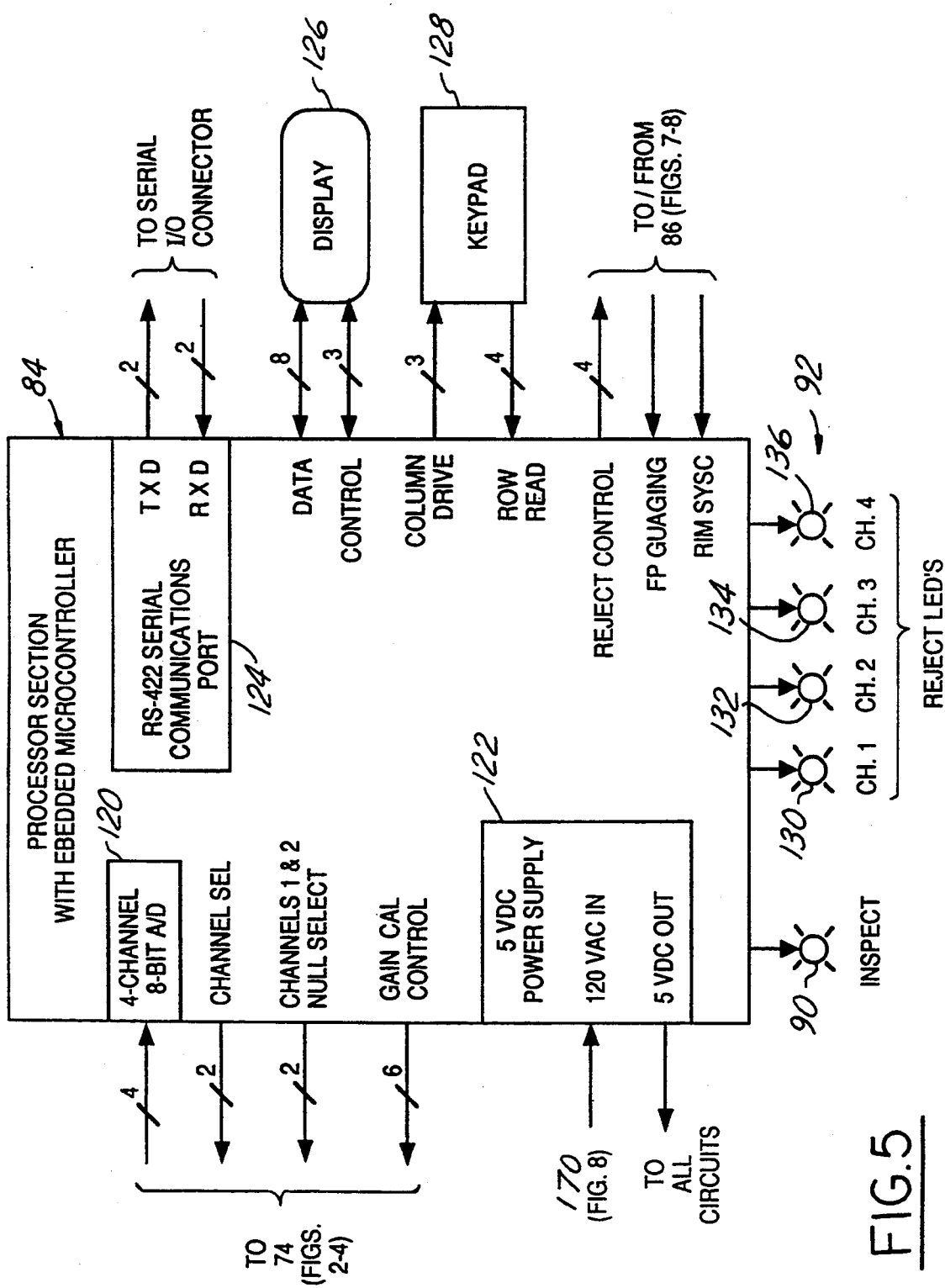
FIG. 5 is a functional block diagram of the processor section in the system of FIG. 2.

Processor section 84 is illustrated in FIG. 5 as including a four-channel eight-bit a/d convertor/multiplexer 120 that receives analog input signals from the gain controlled scaling amplifiers 110,110a of respective analog input channels 76,78,80,82. Processor section 84 also provides a pair of control signals to circuit 112 of analog section 74 (FIGS. 3 and 4) for selecting which of the four input channel outputs is connected convertor/multiplexer 120, a pair of control lines to select channels 76 and 78 for null set-up, and six lines for controlling gain of scaling amplifier 110,110a in the selected input channel. A five volt regulated d.c. power supply 122 receives input power from machine interface section 86 (FIG. 8), and provides five volt d.c. output power to all system circuitry. An RS-422 serial I/O communications port 124 has differential I/O lines connected to a serial I/O connector. An alphanumeric display 126 is connected by suitable data and control lines to processor section 84, as is an alphanumeric operator keypad 128. Both display 126 and keypad 128 are mounted on an external operator panel, as are lamp 90 for indicating that a container inspection operation is in process, and bank 92 of reject lamps 130,132,134,136 associated with the respective LVDT input channels. Processor section 84 also receives gauging and synchronization signals from machine interface section 86, and provides reject control outputs through machine interface section 86 to the inspection machine for sorting reject containers.

Figure 6A:
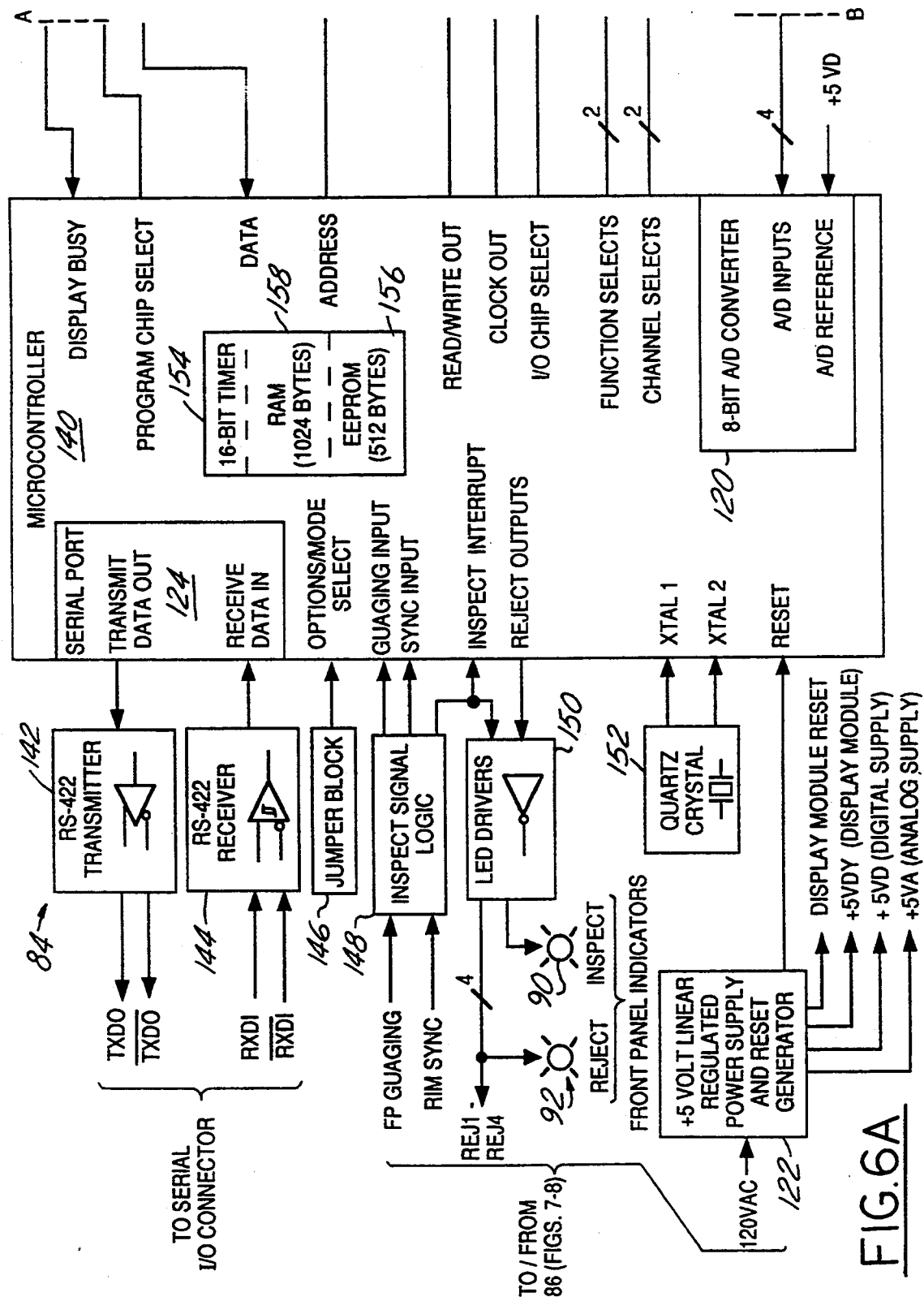
FIGS. 6A and 6B together comprise a more detailed functional block diagram of the processor section illustrated in FIGS. 2 and 5.
Figure 6B:
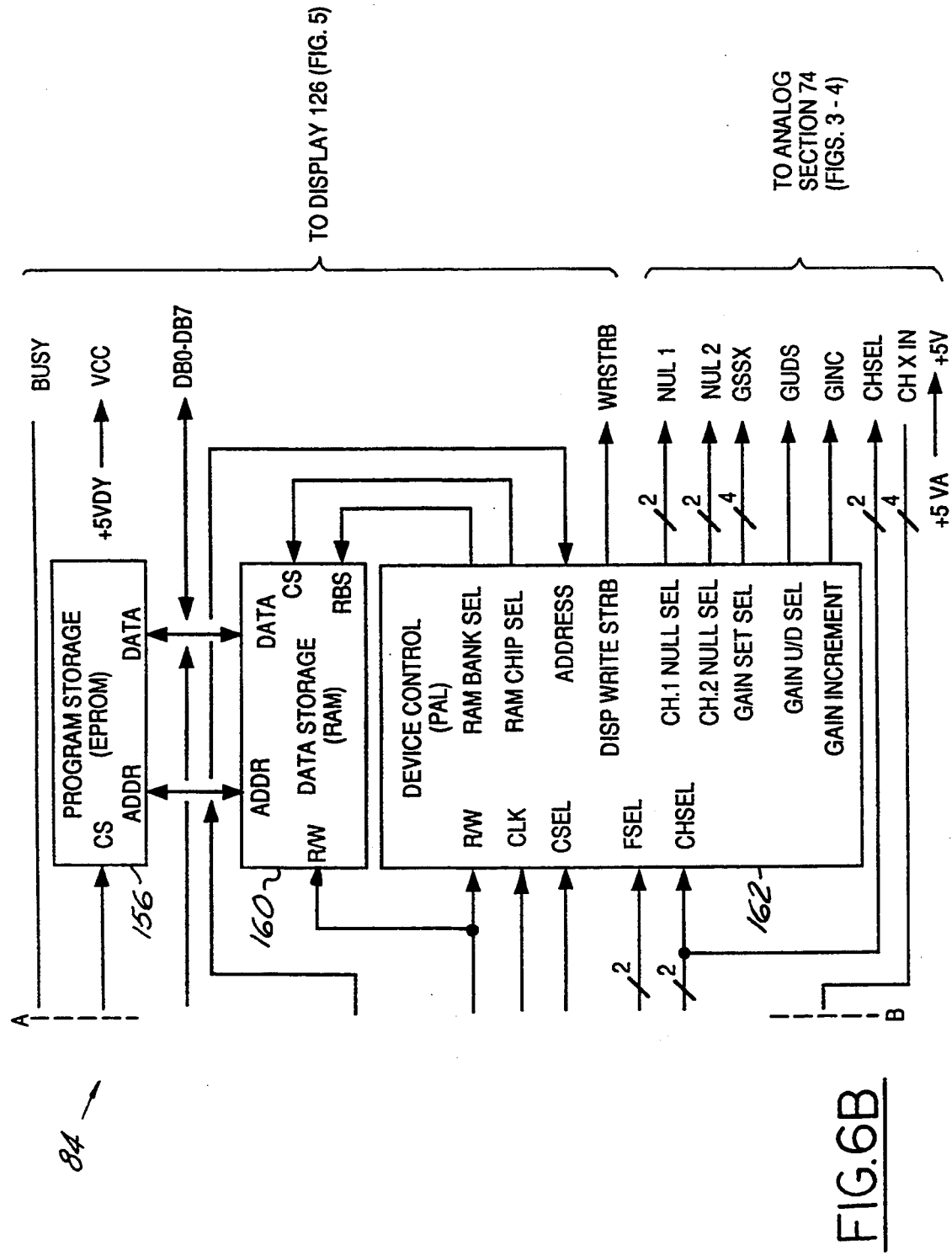

FIGS. 6A and 6B, interconnected along the line A-B in each figure, comprise a more detailed functional block diagram of processor section 84. A microprocessor-based controller or microcontroller 140 includes built-in asynchronous serial I/O port 124 (FIGS. 5 and 6A), which handles transmission and reception of data and control information from the factory data collection system or other suitable computer. The data output of port 124 is connected by an RS-422 differential line driver 142 to a serial I/O connector, which in turn is also connected through a differential line receiver 144 to the input port 124. The asynchronous format is non-return-to-zero, and is fixed by microcontroller 140. A jumper block 146 is connected to microcontroller 140 to allow selection of various optional operating modes.

Figure 7:
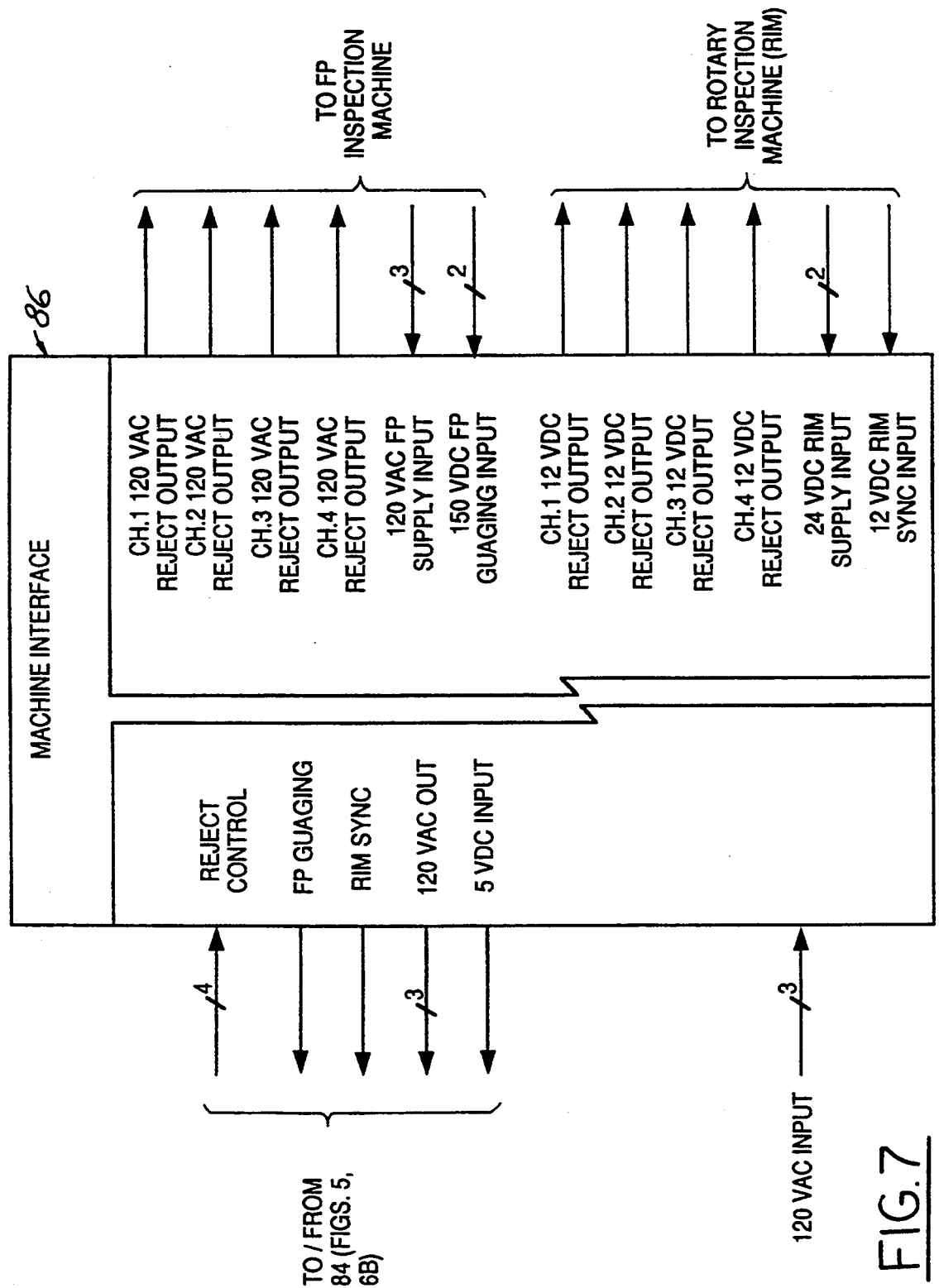
FIG. 7 is a functional block diagram of the machine interface section of the system illustrated in FIG. 2.
Figure 8:
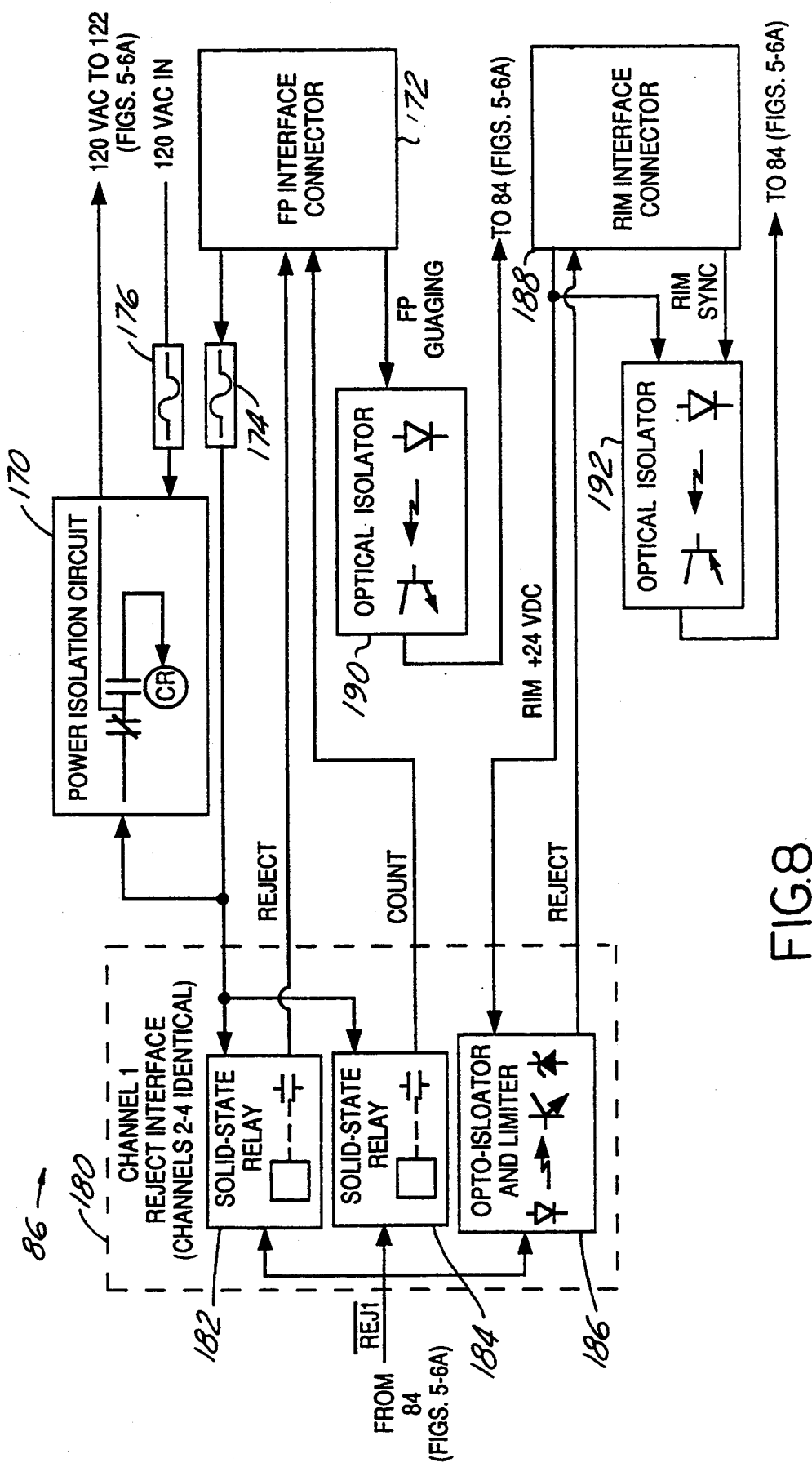
FIG. 8 is a more detailed functional block diagram of the machine interface section illustrated in FIGS. 2 and 7.

An inspection signal logic circuit 148 receives an FP GAUGING signal or a RIM SYNC signal from machine interface section 86, forms an INSPECT INTERRUPT signal fed to the microcontroller. The FP GAUGING or RIM SYNC signal is also applied directly to microcontroller 140. The FP GAUGING and RIM SYNC signals are applied to general-purpose input ports that are polled under software control. (The system is connected in use to either an FP machine or a RIM machine, so only one of the FP gauging and RIM SYNC signals will occur in any installation. However, the system is adapted to receive both.) The INSPECT signal, formed by a logical OR of the GAUGING and SYNC signals, is sent to the microcontroller interrupt input. In operation, when a container is moved into an inspection position on an FP or RIM container handling machine, the INSPECT signal is generated, causing the microcontroller to interrupt operations in process and begin running the inspection programs. By checking the GAUGING and SYNC input signals during set-up, microcontroller 140 determines which type of container handling machine—i.e., an FP machine or a RIM machine—is connected to the system electronics, providing the operator with appropriate instructions for completing the set-up. REJECT lamp bank 92 and INSPECT lamp 90 are coupled to a set of LED drivers 150. The REJECT lamp bank is controlled by REJECT outputs from microcontroller 140, while INSPECT lamp 90 is controlled by the INSPECT INTERRUPT signal from logic 148. The four REJECT signal outputs from drivers 150 are also connected to machine interface section 86 (FIGS. 2, 7 and 8). A quartz crystal 152 provides the system clock for microcontroller 140 and its various internal functions, including a sixteen-bit internal timer 154.

The software for operation of system electronics 84 is stored on an erasable programmable read-only memory or EPROM 156 (FIG. 6B) external to microcontroller 140. Program chip select or CHSEL signals generated by the microcontroller determine when EPROM 156 is accessed. Addresses within the program memory space cause the program chip select line to enable EPROM 156, and the data at the location accessed by the microcontroller ADDRESS bus is placed on the microcontroller DATA bus. Measurement data and scratch Dad storage are provided by a random access memory 158 (FIG. 6A) within microcontroller 140, and by a supplemental random access memory 160 (FIG. 6B) external to the microcontroller. As with EPROM 156, RAM 160 is selected by a chip select line CS. This signal is generated by a programmed array logic or PAL device control circuit 162. Because the microcontroller address space is limited, RAM 160 is split into two halves or banks that are addressed by the state of a RAM bank select line RBS generated by control 162. The microcontroller address ranges for the two banks overlap, while the bank is selected by the RAM bank select line RBS. The state of the read/write line R/W from microcontroller 140 (FIG. 6A) determines whether data is read from or written to RAM 160 (FIG. 6B).

PAL device control circuit 162 performs several control functions under direction of microcontroller 140 (FIG. 6A). Device control 162 generates the chip select and RAM bank select signals CS and RBS for RAM 160. In addition, control circuit 162 controls data write operations to display module 126 (FIG. 5) by means of the WRSTRB line, which in turn is generated from the I/O chip select (CHSEL), read/write (R/W) and ADDRESS lines from the microcontroller. Control circuit 162 also provides control of analog section 74 (FIGS. 3 and 4). By combining the function select and channel select control inputs from microcontroller 140 (FIG. 6A), PAL device control circuit 62 (FIG. 6B) generates the null select signals NUL1 and NUL2 for the analog input channels 80 and 82 respectively; disabling the input channels and allowing the gauge head transducer to be nulled; the gain set select signal GSSX (X=1 to 4) that selects the input channel amplifier 110,110a (FIGS. 3–4) whose gain is to be adjusted; the gain U/D select GUDS that determines whether the gain for the selected channel is to be increased or decreased; and the gain increment control GINC that pulses the selected channel to increment or decrement gain under control of the microcontroller. The two channel select lines CHSEL (FIGS. 5 and 6B) are decoded at null source and gain control selection circuit 112 (FIGS. 3–4) to select which channel's signal is fed to null indicator 94 (FIGS. 2–3). The channel 1 & 2 null select lines in FIG. 5 further select which of the dual LVDT's 34,58 (FIG. 2) is to be nulled and displayed by detector 116 (FIG. 3) and indicator 94 (FIGS. 2–3). Microcontroller 140 (FIG. 6A) also provides two channel select control inputs CHSEL directly to the analog section. These channel select inputs are employed in combination with the null select control signals to select the channel to be nulled, and to feed that channel's null output signal to the null detector (116, FIG. 3) and null indicator 94 located on the operator panel.

The four analog position signals CHXIN (FIG. 6B, X=1 to 4) are applied to the a/d inputs of microcontroller 140 (FIG. 6A), where they are converted to eight-bit numbers corresponding to the positions of the respective gauge heads. The microcontroller DATA bus is connected directly to display module 126 (FIG. 5). The data, in ASCII character format, performs two functions: (1) in the form of special non-displaying control characters the data controls clearing of the display module, cursor position and display brightness; (2) as displayable characters, the data provides the alphanumeric characters to be displayed. A BUSY signal from the display module allows the microcontroller to determine if a new byte of data should be sent, or to wait until the last operation has been completed.

In general, machine interface section 86 (FIGS. 2, 7 and 8) contains the circuitry necessary to convert and electrically isolate the signals between processor section 84 and the two types of container handling machines (FP and RIM) for which the system electronics is adapted. REJECT CONTROL signals from processor section 84 are converted to 120 VAC REJECT outputs by optically isolated solid state relays for interface to an FP machine, or to 12 VDC REJECT outputs by optical isolators for interface to a RIM machine. Optical isolators are also employed to convert a 150 VDC FP GAUGING signal and a twelve VDC RIM SYNC signal to a five-volt signal level for use in processor section 84. A.C. power to operate the system electronics is obtained differently from the two types of handling machines. For an FP machine, 120 VAC is input from the FP machine through the same cable that carries the GAUGING and REJECT signals. In RIM machine applications, the 120 VAC input is obtained through a separate power cable. The source of the 120 VAC input power for power supply 122 (FIGS. 5 and 6A) is automatically selected by a relay circuit.

More particularly, referring to FIG. 8, machine interface section 86 includes a power isolation circuit 170 that accepts 120 VAC line voltage either from the FP interface connector 172 through a fuse 174, or from a separate connector through a fuse 176 for direct delivery of utility power. Power applied through one of these two sources is fed to power supply 122 (FIGS. 5 and 6A) in processor section 84. Isolation circuit 170 prevents such power from appearing at the terminals of the unused source. FIG. 8 also illustrates one of four identical reject interface channels 180 electrically to isolate the measurement electronics from the container handling machines. The REJECT signal from processor section 84 (FIGS. 5 and 6A) drives three isolators 182,184 and 186 for each reject interface channel. Isolator 182 is a solid state relay isolator to provide a 120 VAC REJECT signal to an FP container handling machine connected to connector 172. Isolator 184 is likewise a solid state relay that provides a 120 VAC REJECT COUNT signal to an FP machine connected to interface 172. Isolator 186 is an optical isolator and voltage limiter that provides a 12 VDC REJECT signal to a RIM container handling machine connected to the connector 188. Isolators 182,184 receive power through fuse 174 from FP interface connector 172, while isolator 186 receives 24 VDC Dower from RIM interface connector 188.

The specific FP container handling machine for which the presently preferred embodiment of the invention is adapted requires that the REJECT and REJECT COUNT signals be separate since the counters are on a per-inspection basis, while the reject circuitry is on a per-station basis. The specific RIM container handling machine for which the presently preferred embodiment of the invention is particularly adapted, on the other hand, derives its reject counts internally based upon input from the system electronics, thus requiring only the REJECT signal. The four FP REJECT and four FP REJECT COUNT signals are passed to an FP machine through connector 172, while the four RIM REJECT signals are passed to a RIM handling machine through the connector 188. The 150 VDC FP GAUGING signal from an FP machine coupled to connector 172, and a 12 VDC RIM SYNC signal from a RIM handling machine coupled to connector 188, are optically isolated by the respective circuits 190,192 for transmission to processor section 84 (FIGS. 5 and 6A).

In operation, the machine electronics 70 is first connected to either an FP container handling machine or a RIM container handling machine. (It will be understood that the present invention is by no means limited to these specific types of container handling machines, although the preferred embodiment of the invention is especially adapted therefor). If the system is used in connection with an FP machine, energization of the FP machine automatically applies utility power to the system circuitry through interface section 86 (FIGS. 2, 7 and 8). If the system is connected to a RIM handling machine, separate utility power is provided. With power applied to the container handling machine and to the inspection system electronics, the system is first set up and calibrated.

As part of a set-up operation, the system is controlled from operator keypad 128 (FIG. 5) to select each input channel in turn to ensure that the associated LVDT is in the null position, and to adjust the LVDT/roller if the LVDT core is not in the null position. Next, one or more calibration containers of known physical dimensions are fed in sequence through each inspection station. At station 24 (FIG. 1A), the calibration container is rotated, and nonperpendicularity between the container bottom and the container axis is sensed by rollers 30,32 and LVDT 34. The corresponding measurement is indicated at display 126 (FIG. 5), in English or metric units as selected by the operator through keypad 128. If the measurement so displayed is not correct, the gain of scaling amplifier 110a (FIG. 4) is increased or decreased by the operator until the measurement indication is correct. The correction scaling factor is stored, and thereafter applied to that input channel during a measurement operation. This same process is repeated with the same or different calibration container at each of the successive measurement stations 36,50,60 (FIGS. 1B-1D) to calibrate each sensor input channel. Next, the reject limits and other control parameters are entered by the operator through keypad 128. In this connection, it will be noted that the reject limits are set independently of the calibration operation, as distinguished from the above-noted prior art in which the go/no-go reject levels are determined by means of a calibration container. In this way, an operator may selectively change the reject limits at keypad 128 without having to recalibrate any of the inspection stations.

With the system so set up and calibrated, and with reject limits entered, the container handling machine and gauging system are placed in operation. Containers are continuously fed in sequence through the inspection stations, at which the dimensional parameters of the containers are measured. At each station, the measured dimensional parameters are compared to the reject limit or limits set by the operator, and a reject signal is automatically generated if the container parameters exceed the reject limits. A corresponding reject signal is fed to the container handling machine to sort the container from the conveyor line, and the corresponding lamp of bank 92 (FIG. 5) is illuminated. It will be appreciated, of course, that at any given time, different containers are disposed at each inspection station. The system automatically tracks containers through the sequential inspection stations. Inspection data may be downloaded at will to a central information system by means of the system serial communications port 124.

In a working embodiment of the present invention, microcomputer 140 comprises a 68HC11F1 (Motorola), and PAL device control circuit 162 comprises a 22V10 (Advanced Micro Devices). The microfiche Appendix that accompanies this application lists program code stored in EPROM 156 and PAL circuit 162. The various sections of the control programming are summarized in the following table, frames 3–50 being on fiche No. 1, frames 53–100 being on fiche No. 2, frames 103–150 being on fiche No. 3, and frames 153–187 being on fiche No. 4.:

1. CMGEQ10.ASM     Equates     Frames 3 to 11
  This Section defines:
  a. Labels for registers built into the microcontroller
  b. Constants
  c. Storage locations in microcontroller RAM
  d. Gain settings lookup table
  e. Jump tables
  f. EEPROM checksum storage locations and value
  g. Interrupt vector assignments
2. CMGST10.ASM     Startup     Frames 12 to 16
  a. Initializes microcontroller configuration registers and display
  b. Restores inspection setup information from EEPROM
  c. Displays initial message
3. CMGGS10.ASM     General Subroutines     Frames 16 to 29
  a. Reject output control
  b. Determining if the container handling machines is in "sync", i.e., if it is in position to inspect containers
  c. Generating various length time delays
  d. Analog hardware control
  e. External RAM bank selection
  f. Menu display, selection and vectored jump generation
  g. Testing for the presence of an initialization jumper
4. CMGMA20.ASM     Math Subroutines     Frames 29–39
  a. Format conversion
  b. Modulo-3 to Modulo-2 offset conversion
  c. 16 × 16 Multiply
  d. Analog channel gain calibration
5. CMGKB20.ASM     Keyboard Subroutines     Frames 39–49
  a. Operator keyboard scanning and decoding
  b. English and Metric keyboard entry
6. CMGDY10.ASM     Display Subroutines     Frames 50 and 53–59
  a. Initialization and control
  b. Character, line (string) and message (four-line) display
7. CMGSE10.ASM     Serial Port Subroutines     Frames 59–65
  a. Data interface packet description, setup and transmission
  b. Serial interface test routines
8. DMGTR10.ASM     Test Subroutines     Frames 65–93
  a. A/D Converter
  b. Sync signal interface (FP Gauging and RIM Sync)
  c. FP starwheel pocket consistency
  d. Reject outputs -continued e. Analog gain setting functions
f. EPROM (Program memory) validity
g. Internal (microcontroller) and external memory operation
h. Keyboard
i. Display
j. Power-up system tests--Performed each time power is applied
k. System initialization tests--Performed after vendor construction. Also initializes default setup parameters 9. CMGMR10.ASM  Main Routines  Frames 94-99
Contains display routines and program jump tables for:
a. Main Menu
b. Setup Mode Menus
c. Run Mode Menus
d. Options Menus
e. Test Mode Menus 10. CMGLNRSX.ASM  Leaner Inspection Setup  Frames 99-100 and 103-116
11. CMGOORSX.ASM  OOR Inspection Setup  Frames 116 to 128
12. CMGHGTSX.ASM  Height Inspection Setup  Frame 129
13. CMGRN20.ASM  Run (Inspection) Mode Routines  Frames 129-150 and 153-163
   a. Display of inspections, measurements and total reject counts for each active inspection
   b. Reject settings menus for:
      i. Changing rejection limits
      ii. Toggling inspection rejects on and off
      iii. Setting/cleaning measurement traps of last container inspected or rejected
      iv. Zeroing total reject counters
14. CMGIN10.ASM  Interrupt Subroutines  Frames 163 to 168
Performs actual inspection of the containers. This set of routines is executed only when either an FP Gauging signal or a RIM Sync signal causes a processing interrupt on the microcontroller IRQ input.
15. CMGER10.ASM  Error Handler Subroutine  Frames 168 to 169
Entered only if the microcontroller tries to execute an illegal opcode. This would occur, for example, with a fault in the program EPROM.
16. CMGEE10.ASM  EEPROM Subroutines  Frames 169 to 182
   a. Setup memory checksum generation
   b. EEPROM block boundary validity
   c. EEPROM write and save (byte and block)
   d. EEPROM validity check
   e. Setup data backup and restore
   f. EEPROM initialization
17. CMGDV10.ASM  Development Routines  Frames 182 to 185
These are used for troubleshooting during software and hardware development. They were left in this software version in case any unforeseen problems developed during the initial production run. The routines:
   a. Save data to external RAM
   b. Dump external RAM contents to the serial port
18. PAL Chip 162  Frames 186 to 187

Figure 9A:
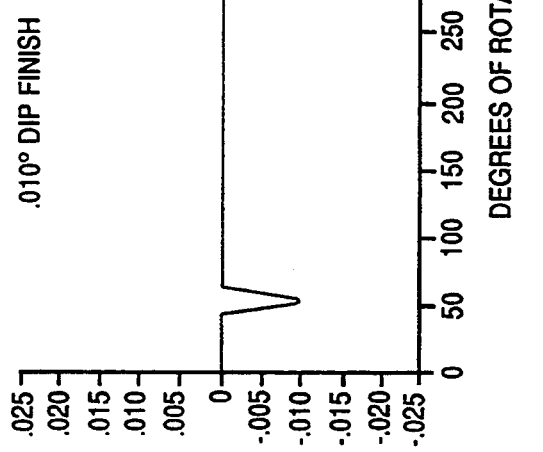
Figure 9B:
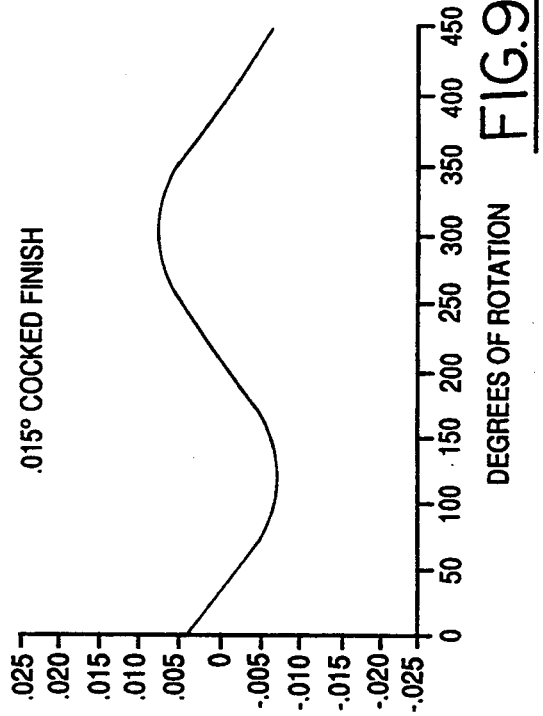
Figure 9C:
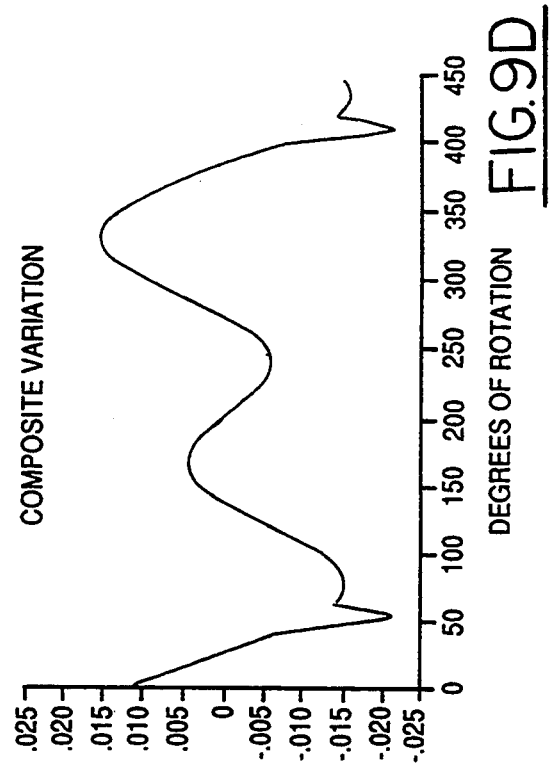
Figure 9D:
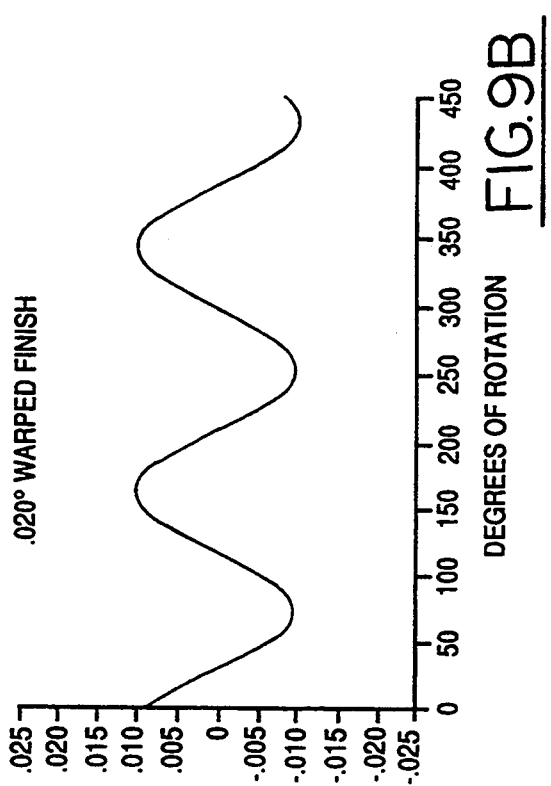

The programming employs digital filtering techniques to perform warped, dip and cocked finish inspection using the signals obtained from LVDT 58 at inspection station 50 (FIG. 1C). As previously noted, this station employs two rollers 54,56 mechanically coupled to LVDT 58 and riding on the top sealing surface of the container finish at 180° spacing. FIG. 9A illustrates a typical cocked finish signal generated by one roller over one and one-quarter rotations (450°), having one high spot and one low spot with smooth transitions. FIG. 9B illustrates a typical warped finish signal having two high spots and two low spots with smooth transitions, and FIG. 9C illustrates a typical dip finish signal with one abrupt transition and return over a small angle of rotation. A given container may exhibit one or more of these characteristics, and FIG. 9D illustrates the combined variations of FIG. 9A-9C. FIG. 9E illustrates the signals from both rollers for the example of FIG. 9D.

It is a task of the control programming to separate the warped, cocked and did finish components of the signals of FIG. 9E so as to quantify deviations from nominal or normal levels, and reject containers for which one or more of these components exceed desired limits. In general, this is accomplished by employing the periodicity of the signals and half-cycle cancellation techniques. During inspection, the containers are rotated at least one and one-quarter revolutions (450°), and the signals from the two roller/LVDT's are sampled, subjected to a/d conversion and stored in RAM 160 (FIG. 6B). The number of signal samples per rotation is determined by container diameter, container spin rate and the total number samples N. The sampling process thus yields two sets of digital data $F_{1i}$, $F_{2i}$, for $i = 1, 2, \ldots N$.

To separate the signal components, the following operations are then performed on the stored data sets $F_{1i}$, $F_{2i}$:

$$\text{for } i = 1 \text{ to } (N - T_1) \text{ do begin}$$
$$F_{xi} = 2x(F_{1(i+T1)}) \tag{1}$$
$$F_{zi} = F_{xi} - F_{1(i+T2)} + F_{2(i+T2)} \tag{2}$$
$$\text{if } i = 1 \text{ then begin}$$
$$dpp = F_{zl} \tag{3}$$
$$dnp = F_{zl} \tag{4}$$
$$\text{end}$$
$$\text{else begin}$$
$$\text{if } F_{zi} > dpp \text{ then } dpp = F_{zi} \tag{5}$$
$$\text{if } F_{zi} < dnp \text{ then } dnp = F_{zi} \tag{6}$$
$$\text{end}$$
$$\text{end}$$

$$dpk = \frac{(dpp - dnp)}{1 + 2} \tag{7}$$

$$ofs = dpp - dpk \tag{8}$$
$$\text{for } i = 1 \text{ to } N - T_1 \text{ do begin}$$
$$F_{ci} = F_{xi} - ofs \tag{9}$$
$$\text{if } F_{ci} > cpp \text{ then } cpp = F_{ci} \tag{10}$$
$$\text{end}$$
$$\text{for } i = 1 \text{ to } N - T_0 \text{ do begin}$$

$$F_{wi} = F_{1(i+T2)} + F_{1(i+T0+T2)} - \frac{ofs}{2} \tag{11}$$

$$\text{if } F_{zi} \geq ofs \text{ then } F_{wi} + F_{zi} - ofs \tag{12}$$
$$\text{if } F_{wi} > wpp \text{ then } wpp = F_{wi} \tag{13}$$
$$\text{end}$$

The meaning of the variables and functions in this algorithm are as follows:
cpp = Positive peak cocked finish signal
wpp = Positive peak warped finish signal
dpp = Positive peak dip finish signal
dnp = Negative peak dip finish signal
dpk = Peak dip finish signal
ofs = Correction offset
$F_{xi}$ = Intermediate data set—Contains only cocked, dip and height offset components
$F_{zi}$ = Intermediate data set—Contains only dip and height offset components
$F_{ci}$ = Cocked finish signal component
$F_{wi}$ = Warped finish signal component Among the above variables, the peak values dpk, cpp and wpp are exactly those desired for dip finish, cocked finish and warped finish determination respectively. These variables are compared to respective inspection limits, and appropriate reject signals are generated if any limits are exceeded. The values are also displayed and transmitted to the factory data collection system.

Figure 10C:
Figure 10D:
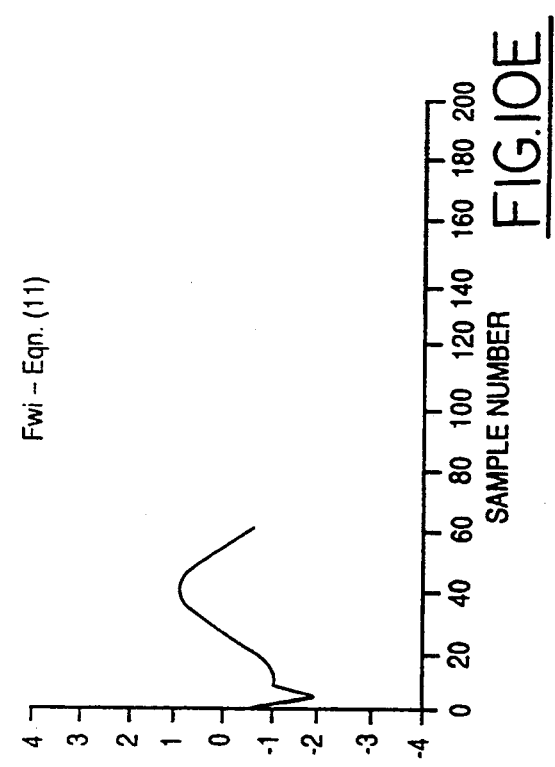
Figure 10E:
Figure 10F:
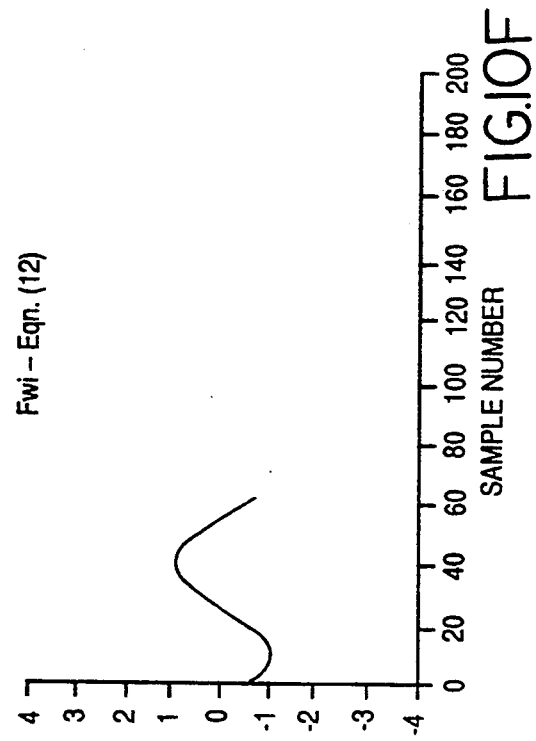

FIGS. 10A–10F illustrate the various signals processed by the algorithm described above. FIG. 10A illustrates the two composite signals of FIG. 9E by sample number rather than angle. FIG. 10B illustrates signal $F_{xi}$ per equation (1), and FIG. 10C illustrates signal $F_{zi}$ per equation (2). The latter is the dip finish signal. Equations (5)–(7) search for the peak value dpk, which in FIG. 10C is equal to about 1.5 units. FIG. 10D illustrates $F_{ci}$ per equation (9). This is the cocked finish signal (with dip finish components). Equation (10) searches for the positive peak cpp of this signal, which is one unit in this example. FIG. 10E illustrates $F_{wi}$ per equation (11), which is the warp finish signal with dip finish component. FIG. 10F illustrates $F_{wi}$ per equation (12), which is the warp finish signal with did finish component removed. Equation (13) searches for the peak positive value wpp of this signal, which is one unit in this example.

I claim:

1. A system for contact measurement of at least one dimensional parameter of a container having a container finish comprising:

means for conveying containers in sequence to an inspection station, means at said station for contacting a container at said station and providing an electrical analog signal as a combined function of warp, dip and cock of the finish of the container, means for receiving said analog signal and converting said analog signal to a digital signal, microprocessor-based electronic control means coupled to said receiving and converting means, including digital filtration means for separating warp, dip and cock signal components from said combined signal, and means for comparing said signal components to preset signal component thresholds, and means for displaying the result of such comparison in real time.

2. The system set forth in claim 1 wherein said means for contacting said container comprises means for providing a plurality of additional analog signals as a function of differing dimensional parameters of the container, and wherein said means for receiving and converting said analog signal comprises means responsive to said control means for selecting among said plurality of analog signals.

3. The system set forth in claim 1 wherein said means for receiving and converting said analog signal comprises an amplifier and means responsive to said control means for controlling gain of said amplifier.

4. The system set forth in claim 3 further comprising means at said station for rotating a container at said station about its central axis, and wherein said means for receiving and converting said analog signal comprises lowpass filter means.

5. The system set forth in claim 4 wherein said means for providing said analog signal comprises an LVDT having primary and secondary windings and a core for operative coupling to the container at said station, means for applying a periodic signal to said primary winding, and a synchronous demodulator having one input coupled to said secondary winding, a second input coupled to said means for applying a periodic signal to said primate winding and an output coupled to said amplifier.

6. The system set forth in claim 5 further comprising means coupled to said LVDT for indicating null position of said core.

7. The system set forth in claim 1 wherein said control means further includes means for collecting and storing data associated with inspection of a plurality of containers, and communication interface means for transmitting said data to a remote computer.

8. The system set forth in claim 1 wherein said displaying means comprises an alphanumeric display for displaying said digital signal in units of said parameter.

9. The system set forth in claim 8 wherein said control means includes means for selecting between English and metric units of said parameter.

10. A method of measuring at least one dimensional parameter of containers having a sealing surface comprising the steps of:

(a) contacting the sealing surface of a container with two rollers spaced 180° from each other and coupled to sensor means that provides an analog signal as a combined function of war, dip and cock at such sealing surface, (b) rotating the container about its axis so that said rollers move and said signal varies as a function of variations in geometry of the container, (c) converting said analog signal to a digital signal, (d) digitally filtering said combined signal to separate digital signal components associated with warp, dip and cock at the container sealing surface, (e) comparing said digital signal components to associated prestored thresholds that correspond to acceptable limits of said components, and (f) indicating acceptance/rejection of the container as a result of such comparison.

11. The method set forth in claim 10 comprising the additional step of (g) calibrating said steps (a)–(d) by:

(g1) contacting said roller in said step (a) with a calibration container for which the value of said at least one parameter is known, (g2) rotating the calibration container about its axis in said step (b) to develop an analog calibration signal that varies as a function of the at least one parameter of the calibration container, (g3) converting said calibration signal to digital format in said step (c), (g4) comparing in said step (d) the value of the at least one parameter indicated by the converted calibration signal with the known value of said parameter for the calibration container, and (g5) scaling said analog signal in step (a) to modify said calibration signal to such known value.

12. The system set forth in claim 11 wherein said step (g4) is accomplished by displaying said value in real time.

* * * * *